(12) United States Patent
Ben-Ari

(10) Patent No.: US 10,841,082 B2
(45) Date of Patent: Nov. 17, 2020

(54) SYSTEM AND METHOD FOR BLOCKCHAIN SMART CONTRACT DATA PRIVACY

(71) Applicant: Adi Ben-Ari, London (GB)

(72) Inventor: Adi Ben-Ari, London (GB)

( * ) Notice: Subject to any disclaimer, the term of this patent is extended or adjusted under 35 U.S.C. 154(b) by 15 days.

(21) Appl. No.: 15/778,619

(22) PCT Filed: Nov. 23, 2016

(86) PCT No.: PCT/IL2016/051264
§ 371 (c)(1),
(2) Date: May 23, 2018

(87) PCT Pub. No.: WO2017/090041
PCT Pub. Date: Jun. 1, 2017

(65) Prior Publication Data
US 2018/0343114 A1    Nov. 29, 2018

Related U.S. Application Data

(60) Provisional application No. 62/259,090, filed on Nov. 24, 2015.

(51) Int. Cl.
| | |
|---|---|
| *H04L 9/08* | (2006.01) |
| *H04L 29/06* | (2006.01) |
| *H04L 9/32* | (2006.01) |
| *G06F 21/62* | (2013.01) |
| *G06F 21/64* | (2013.01) |
| *H04L 9/06* | (2006.01) |
| *H04L 9/30* | (2006.01) |
| *G06F 21/60* | (2013.01) |

(52) U.S. Cl.
CPC ........ *H04L 9/0825* (2013.01); *G06F 21/6245* (2013.01); *G06F 21/64* (2013.01); *H04L 9/06* (2013.01); *H04L 9/302* (2013.01); *H04L 9/3239* (2013.01); *H04L 63/0428* (2013.01); *G06F 21/602* (2013.01); *H04L 2209/38* (2013.01); *H04L 2209/56* (2013.01)

(58) Field of Classification Search
CPC .............................. H04L 9/0825; G06F 21/64
USPC ........................................................ 713/193
See application file for complete search history.

(56) References Cited

U.S. PATENT DOCUMENTS

| | | |
|---|---|---|
| 2004/0175000 A1 | 9/2004 | Caronni |
| 2015/0244690 A1 | 8/2015 | Mossbarger |

(Continued)

OTHER PUBLICATIONS

Zyskind, et al, Decentralizing privacy: Using blockchain to protect personal data. In Security and Privacy 1-9 Workshops (SPW), 2015 IEEE (pp. 180-184). IEEE, retrieved on Feb. 19, 2017, retrieved from the internet: <http://web.media.mit.edu/~guyzys/data/ZNP15.pdf >, May 31, 2015.

(Continued)

*Primary Examiner* — Anthony D Brown
(74) *Attorney, Agent, or Firm* — The Roy Gross Law Firm, LLC; Roy Gross

(57) ABSTRACT

System and method for executing cryptographically secure transactions in a network comprising a public ledger, comprising associating a first proposed transaction with a public keys smart contract and associating at least a second transaction including private data and public data in said network with a cryptographically secure transaction.

9 Claims, 17 Drawing Sheets

SCHEMATIC PROCESS FLOW

(56) References Cited

U.S. PATENT DOCUMENTS

2017/0140408 A1* 5/2017 Wuehler ............ G06Q 30/0207
2017/0147808 A1* 5/2017 Kravitz .................. G06F 21/45

OTHER PUBLICATIONS

Lazarovich, Invisible Ink: Blockchain for data privacy (Doctoral dissertation, Massachusetts Institute of 1-9 Technology), retrieved on Feb. 19, 2017, retrieved from the Internet< https://dspace.mit.edu/bitstream/handle/1721.1/98626/920475053-MIT.pdf?sequence=1>, Jun. 30, 2015.

International Search Report PCT/IL2016/051264 Completed Feb. 20, 2017; dated Feb. 22, 2017 3 pages.

Written Opinion of the International Searching Authority PCT/IL2016/051264 dated Feb. 22, 2017 4 pages.

* cited by examiner

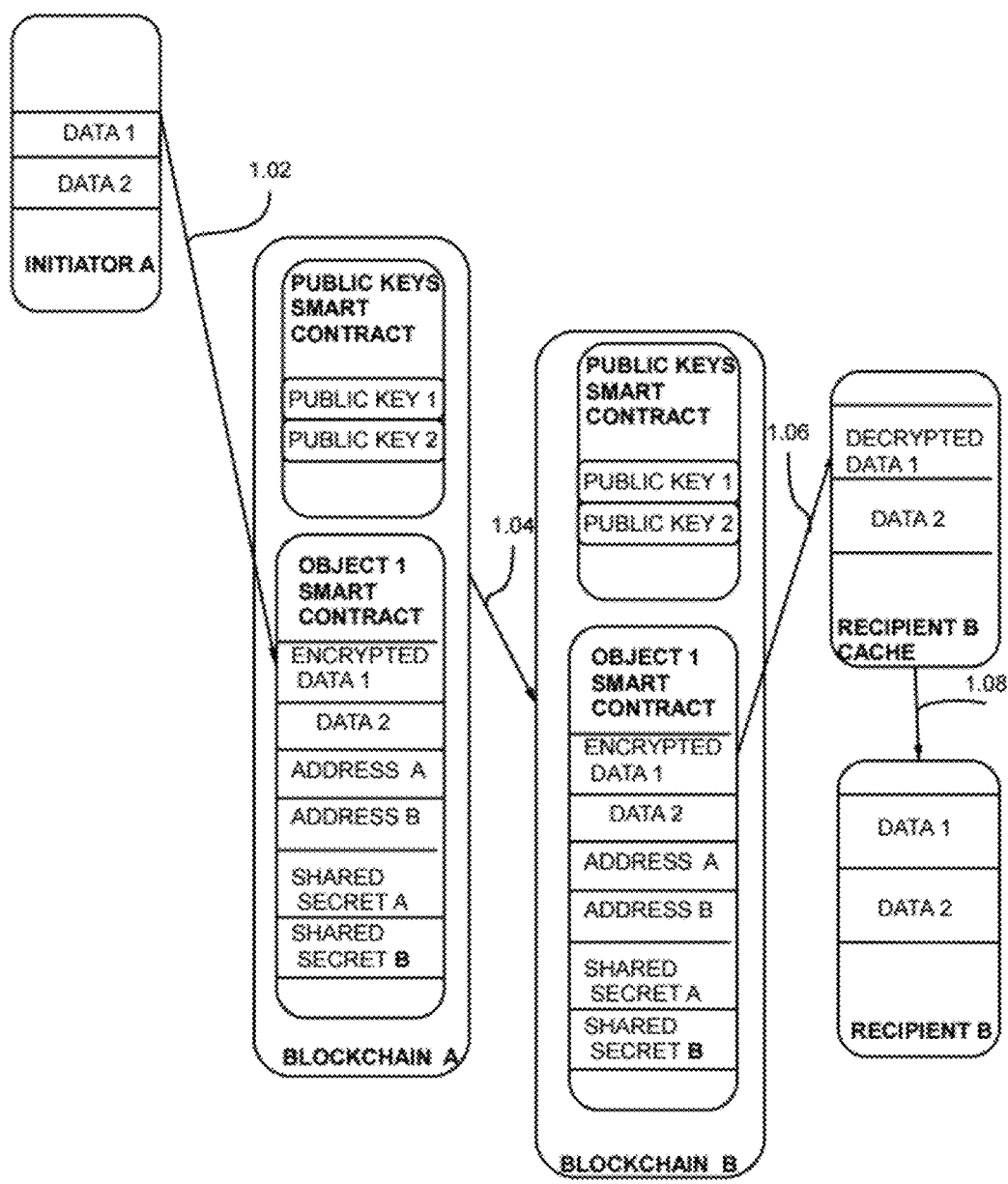
FIG. 1: SCHEMATIC PROCESS FLOW

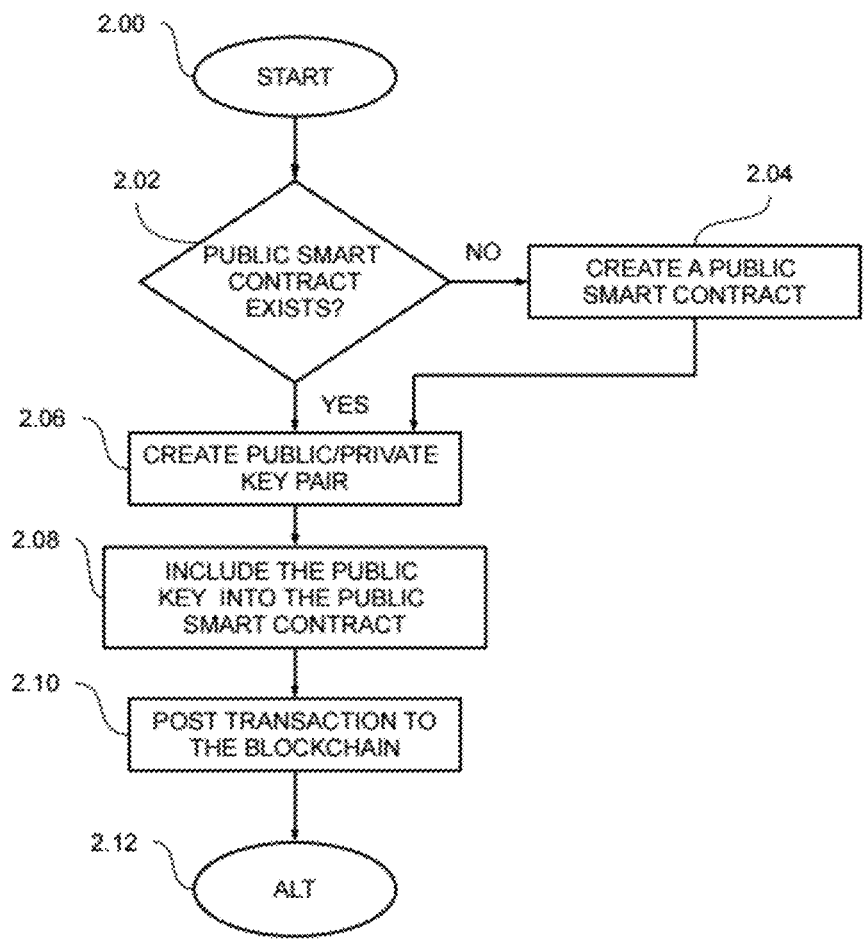
FIG.2: SETUP BLOCK DIAGRAM

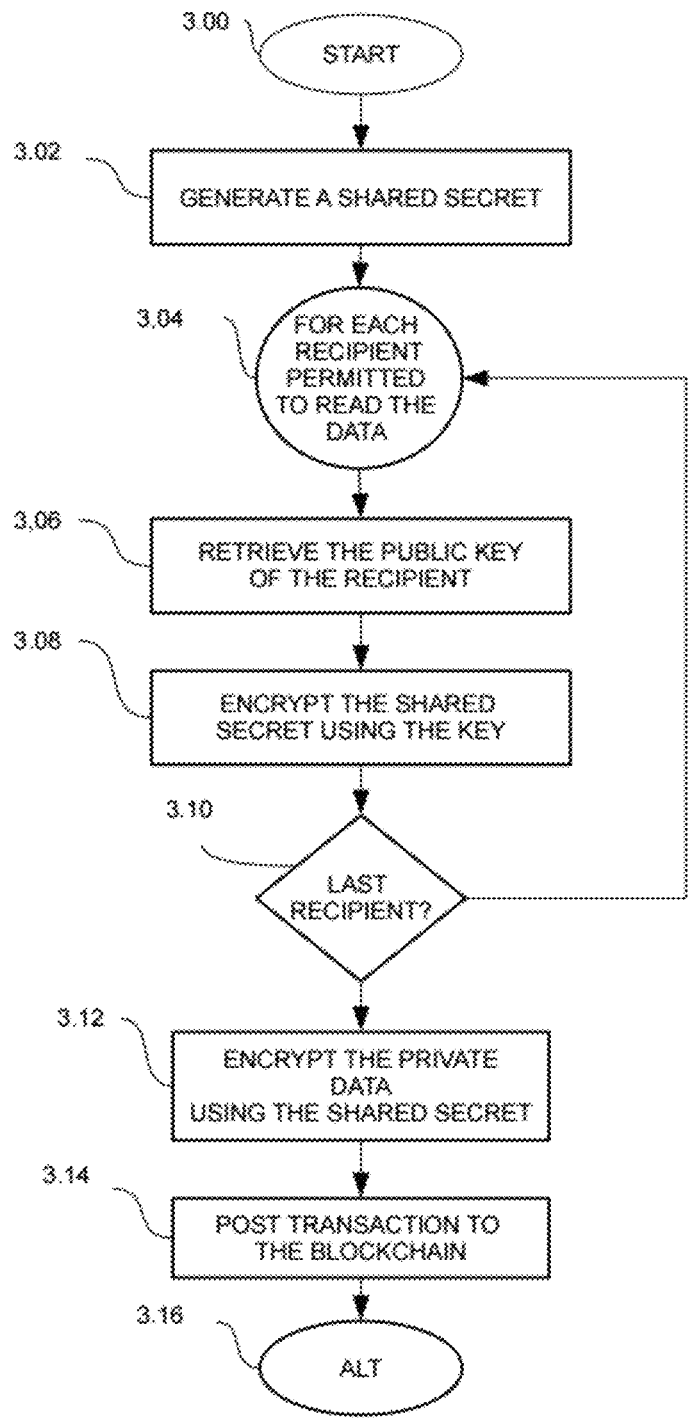
FIG.3: USER DEVICE – ORIGINAL SENDER

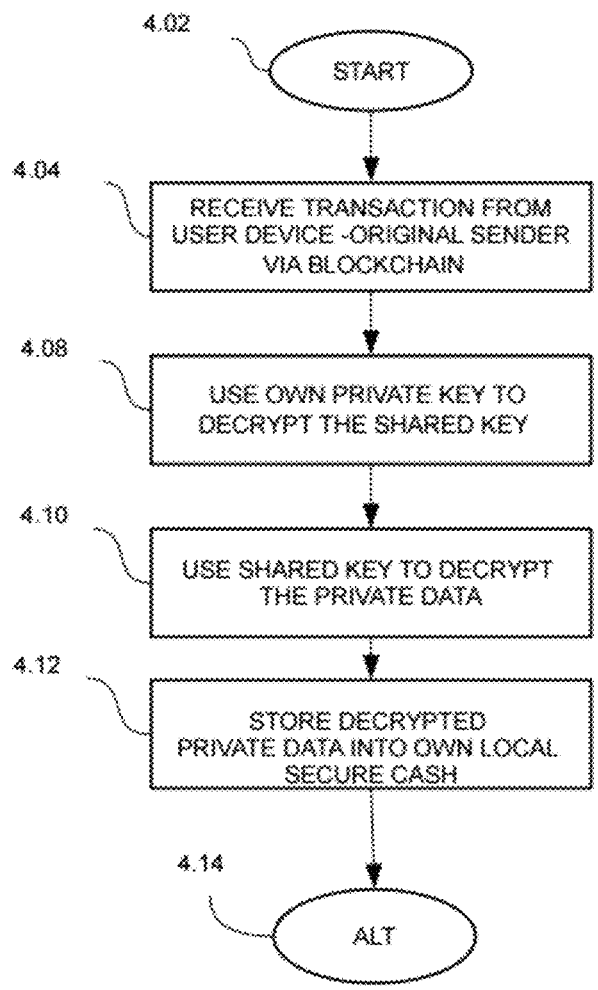
FIG.4 : USER DEVICES – RECIPIENTS

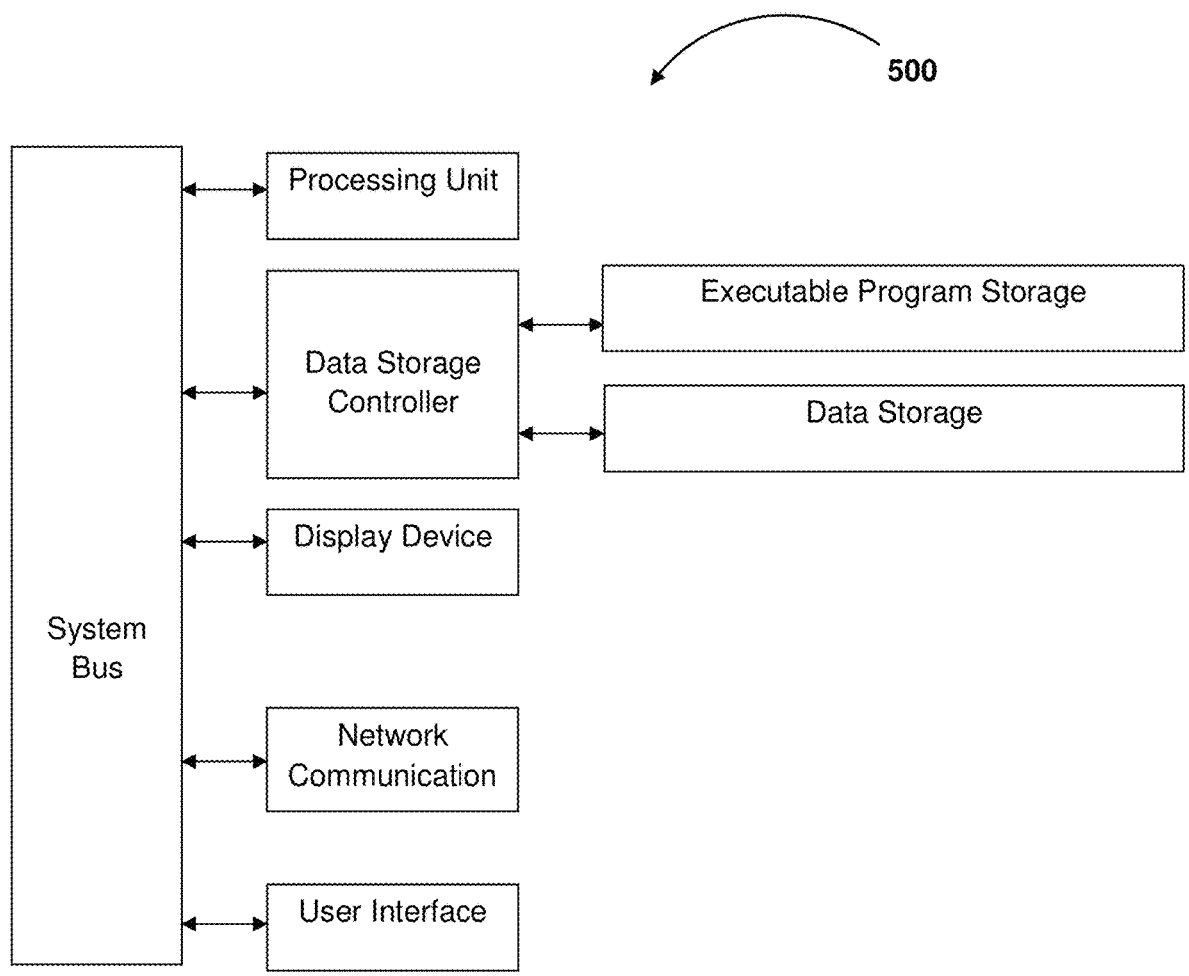
FIG. 5: EXAMPLE OF COMPUTERIZED SYSTEM

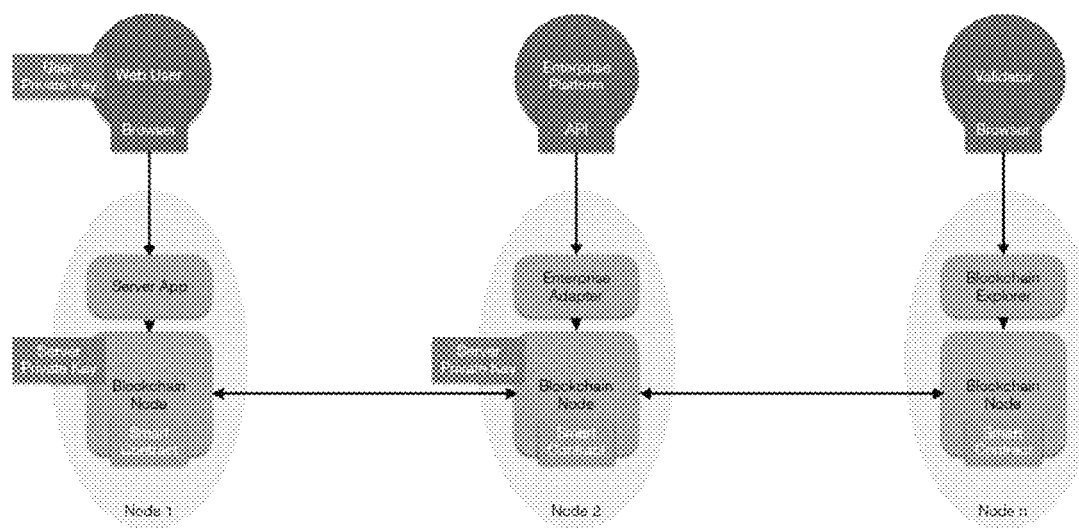
FIG. 6: GENERAL MULTI-NODE CONFIGURATION

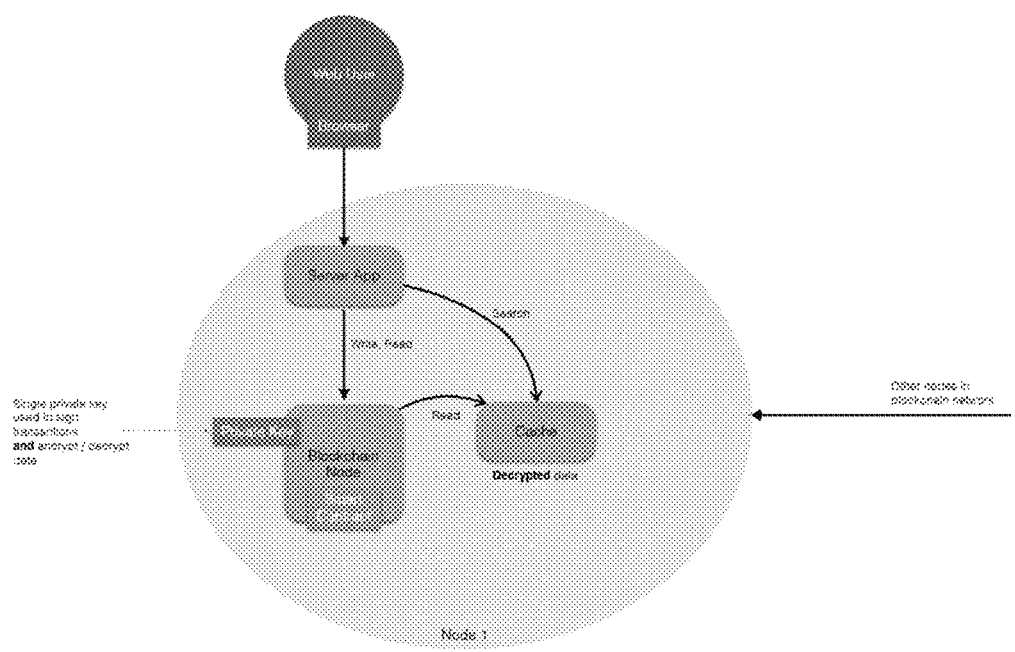
FIG. 7: MODEL 1 CONFIGURATION

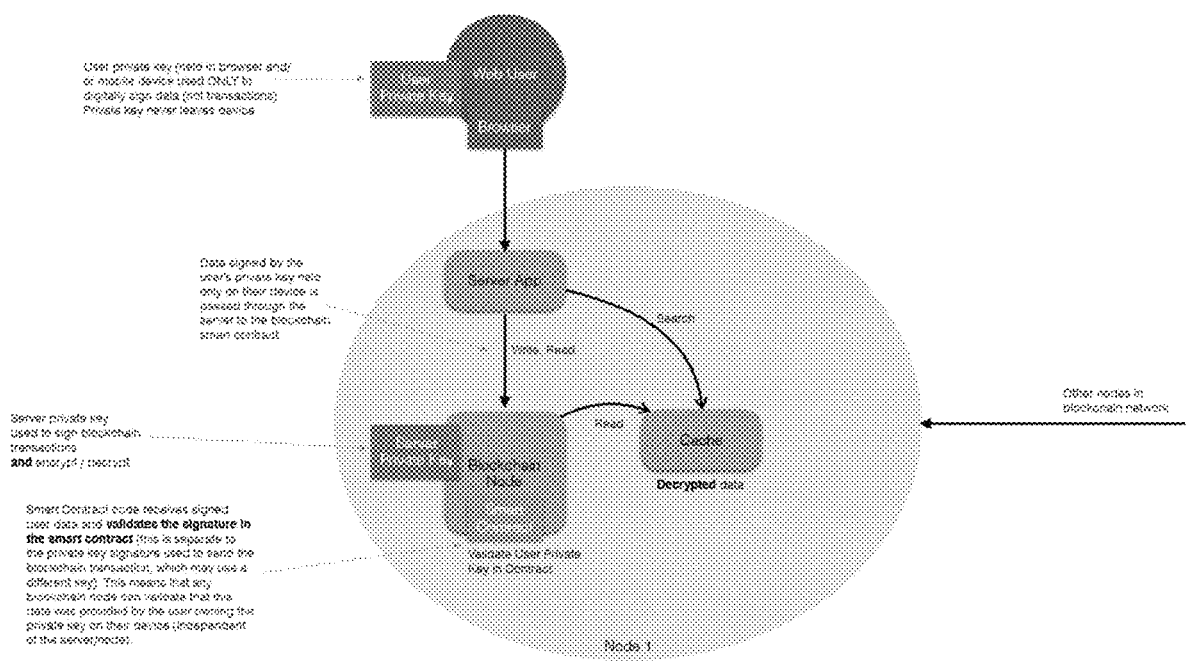
FIG. 8: MODEL 2 CONFIGURATION

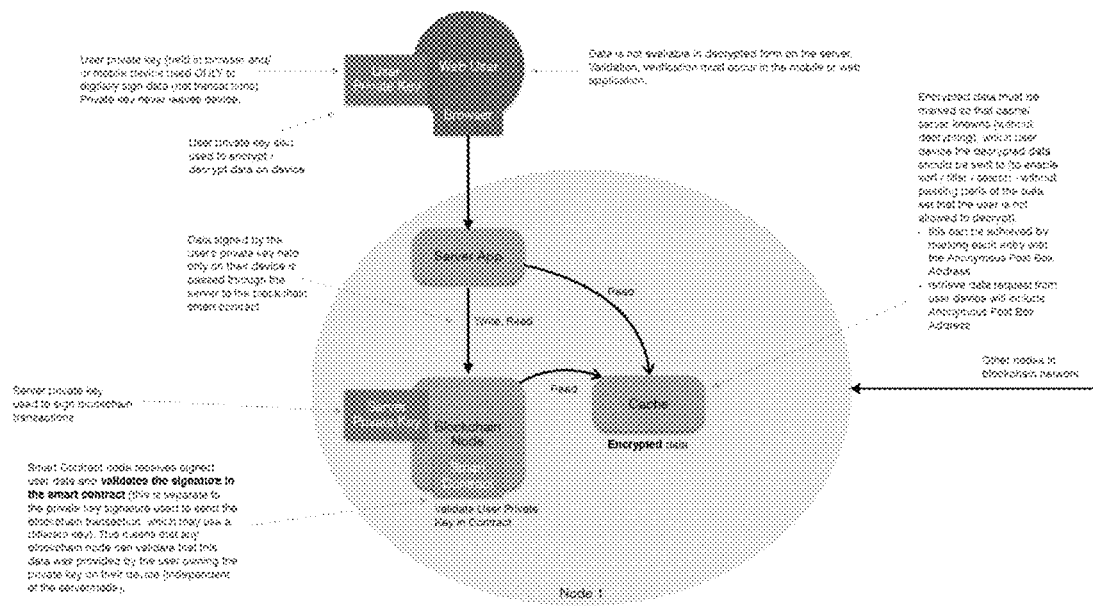
FIG. 9: MODEL 3 CONFIGURATION

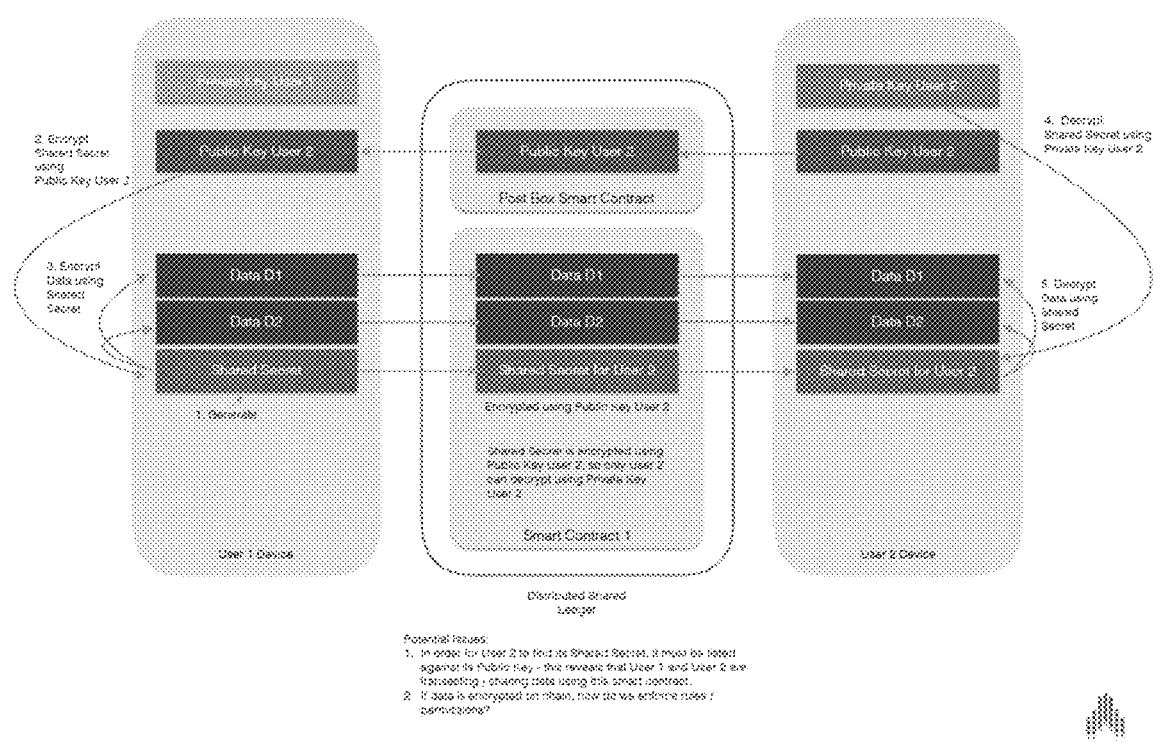
FIG. 10: SMART CONTRACT PRIVACY USING SHARED SECRETS CONFIGURATION

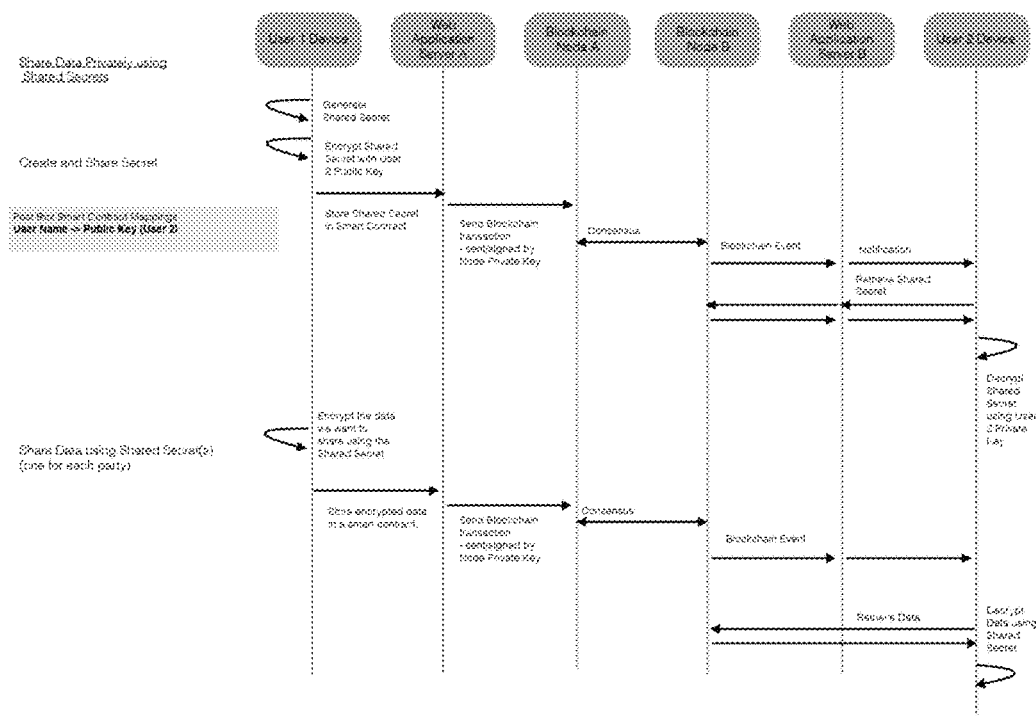
FIG. 11: SMART CONTRACT PRIVACY USING SHARED SECRETS CONFIGURATION FLOW

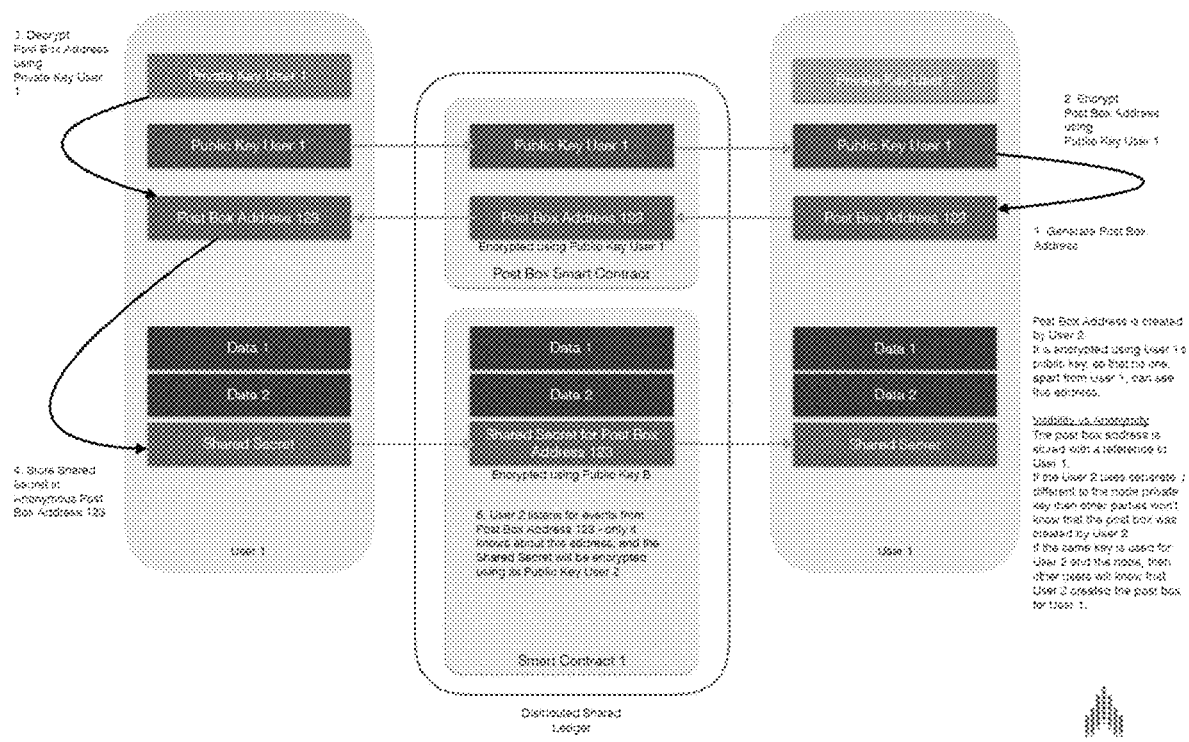
FIG. 12: SMART CONTRACT PRIVACY USING SHARED SECRETS WITH ANONYMOUS RECEIVER POST BOX CONFIGURATION

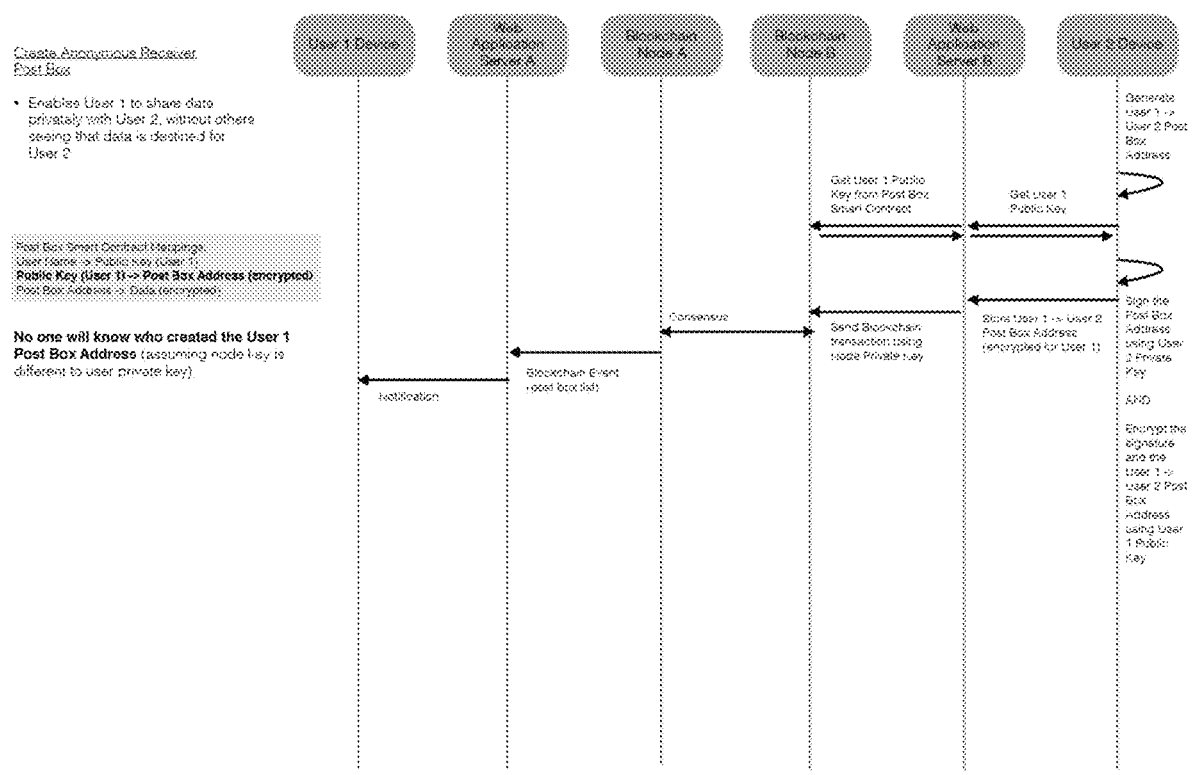
FIG. 13: ANONYMOUS RECEIVER POST BOX CONFIGURATION FLOW

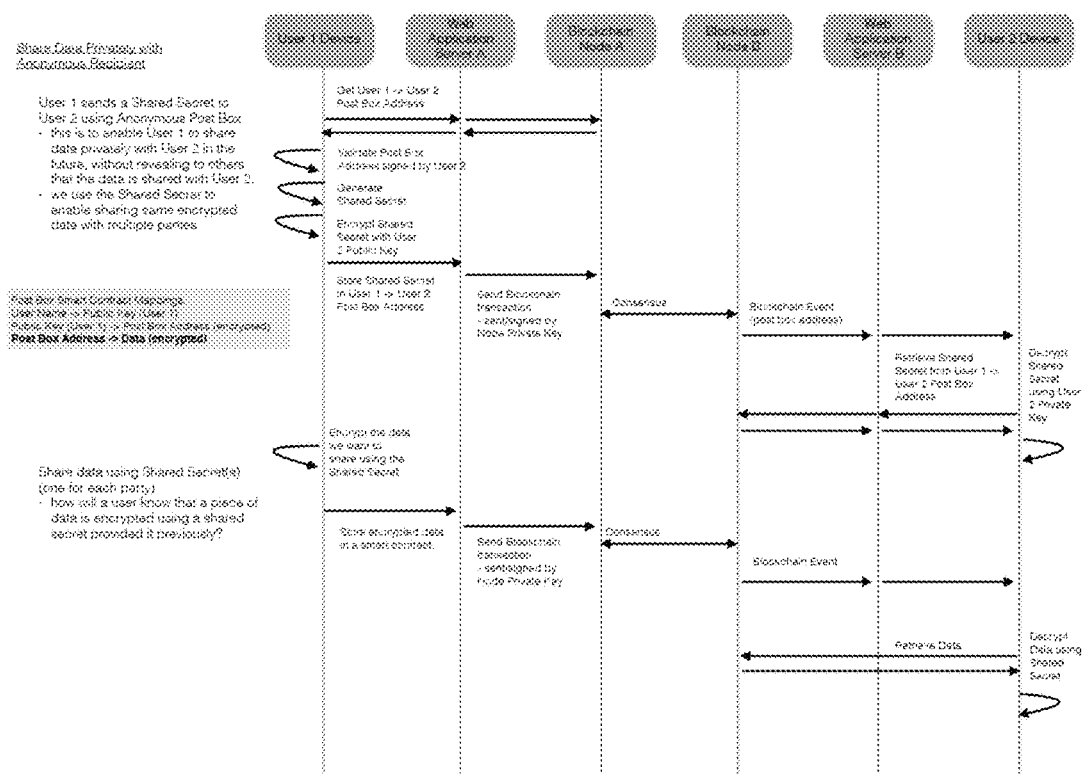
FIG. 14: SHARING DATA PRIVATELY WITH ANONYMOUS RECIPIENT FLOW

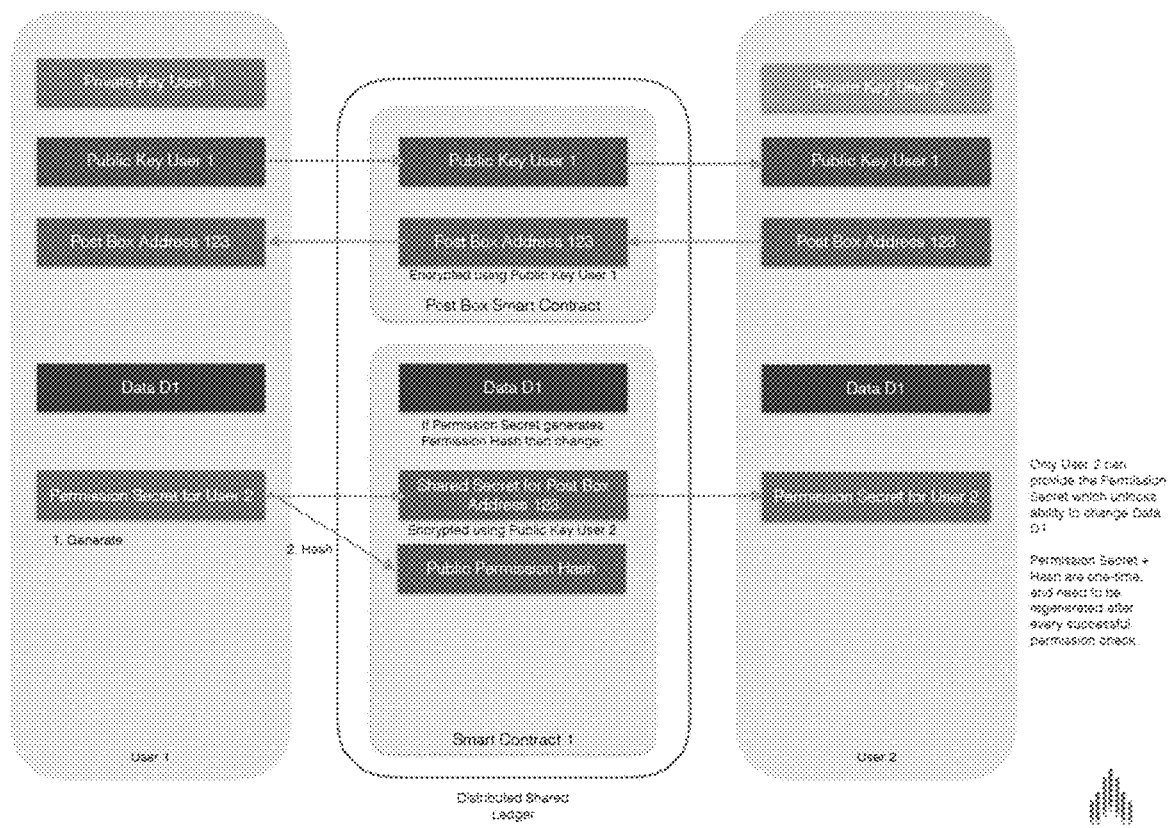
FIG. 15: SMART CONTRACT PRIVACY USING SHARED SECRETS WITH ANONYMOUS RECEIVER POST BOX AND ANONYMOUS PERMISSION CHECK CONFIGURATION

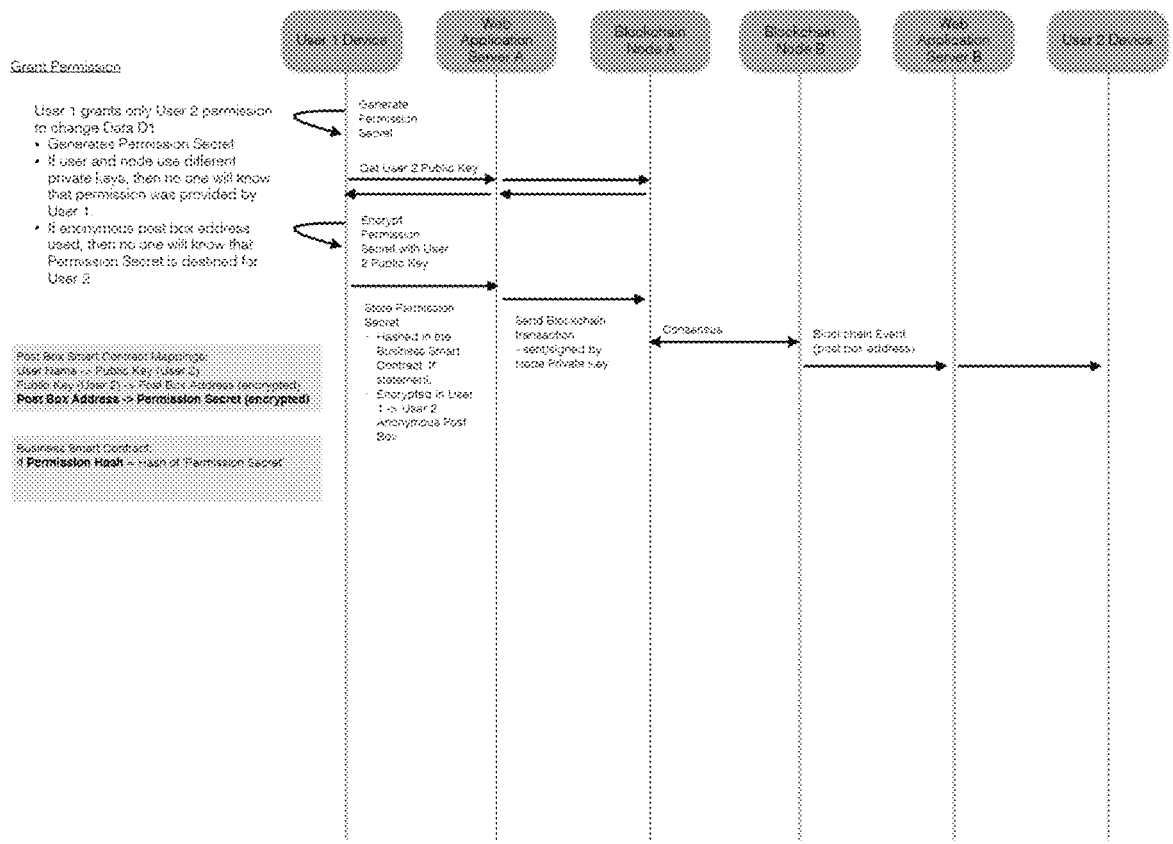
FIG. 16: GRANT PEMISSION FLOW

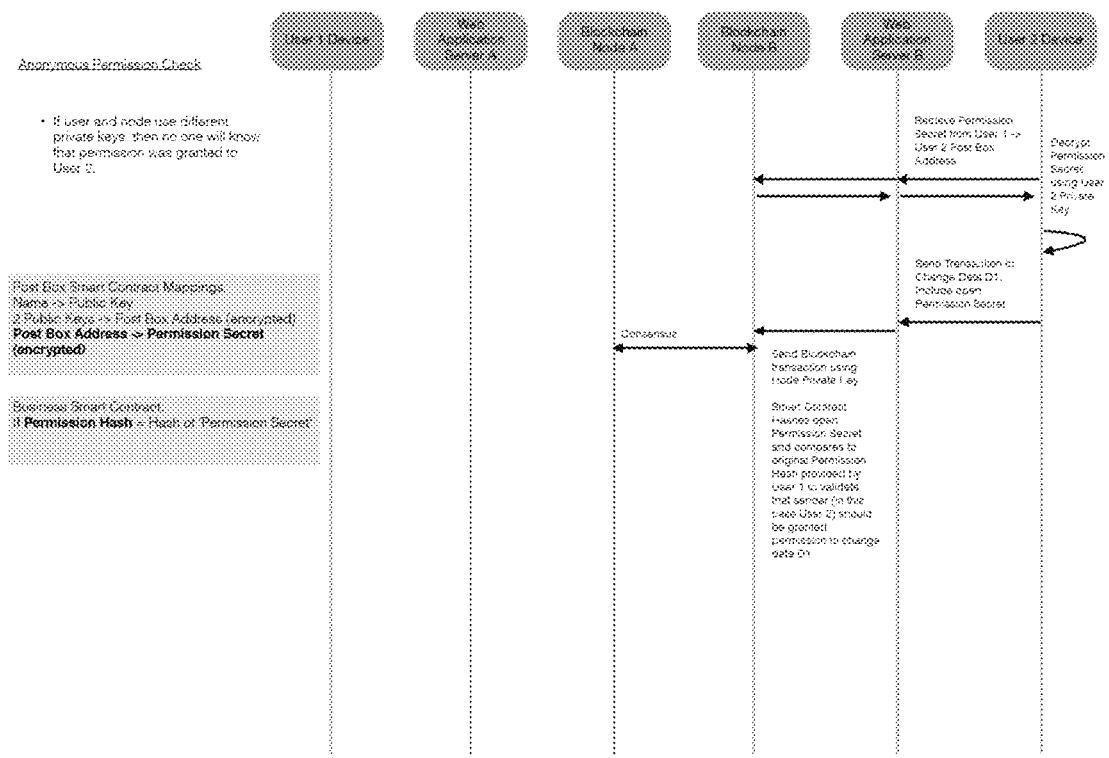
FIG. 17: ANONYMOUS PEMISSION CHECK FLOW

SYSTEM AND METHOD FOR BLOCKCHAIN SMART CONTRACT DATA PRIVACY

RELATED APPLICATIONS

This application is a National Phase of PCT Patent Application No. PCT/IL2016/051264 having International filing date of Nov. 23, 2016, which claims the benefit of priority of U.S. Provisional Application No. 62/259,090 filed on Nov. 24, 2015 entitled A SYSTEM AND METHOD FOR BLOCKCHAIN SMART CONTRACT DATA PRIVACY. The contents of the above applications are all incorporated by reference as if fully set forth herein in their entirety.

FIELD OF THE INVENTION

The present invention relates to a method and system for selectively controlling the data privacy, and more specifically blockchain data privacy.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

Despite the expressiveness and power of blockchain and smart contracts, the present form of these technologies lacks transactional privacy. The entire sequence of actions taken in a smart contract are propagated across the network and/or recorded on the blockchain, and therefore are publicly visible. Their public nature means private data would flow through every full node on the blockchain, fully exposed.

It is not appropriate to make data visible to all the parties in a blockchain network. There are cases when one party wishes to share the data with only one other specified party, without making the data visible or available to the other parties in the blockchain.

In order to achieve data privacy, private data should be encrypted. There are two basic techniques for encrypting information: symmetric encryption (also called secret key encryption) and asymmetric encryption (also called public key encryption). In case of symmetric encryption, one key ("shared secret") is used both for encryption and decryption, where in case of asymmetric encryption, the encryption is performed using a public key and decryption is performed using the private key. POP combines symmetric-key encryption and public-key encryption. The message is encrypted using a symmetric encryption algorithm, which requires a symmetric key. Each symmetric key is used only once and is also called a session key. The message and its session key are sent to the receiver. The session key must be sent to the receiver so they know how to decrypt the message, but to protect it during transmission, it is encrypted with the receiver's public key.

In addition to a requirement for privacy of data within smart contracts, there is often a requirement to preserve transaction anonymity from the majority of network participants. At the same time, we may wish to grant specific participants the ability to identify the party sending a transaction.

Finally, one of the advantages of using blockchain smart contracts to store and share data is the ability to wrap data with permissions logic, thereby limiting who can modify the data. To implement this, we would normally be required to reveal the public key of the parties granted permission (this is so that all the nodes can execute the permission check when independently running the smart contract code). This may not be desirable in a situation where the participating parties do not wish to reveal their identity to all other participants in the network.

It is desirable to have access to these features on most standard blockchain smart contract platforms.

Smart contracts enable the storage of data within blockchain transactions. One of the issues with current contact implementation is performance, Blockchains are starting to be used as shared data stores, but there were never designed to enable fast retrieval of data from smart contracts, this limits the ability of applications to hardness the advantages of the blockchain and smart contract environment.

"Hawk", a decentralized smart contract system (see "Hawk: The Blockchain Model of Cryptography and Privacy-Preserving Smart Contracts" by Ahmed Kosba, Andrew Miller, Elaine Shi, Zikai Wen, University of Maryland and Cornel University)) is a framework for building privacy-preserving smart contracts. Hawk-generated protocols assume a special contractual party called a manager (e.g. an auction manager) besides the normal users.

"Enigma" is a decentralized computation platform (see "Enigma: Decentralized Computation Platform with Guaranteed Privacy" by Guy Zyskind, Oz Nathan, Alex Sandy), with guaranteed privacy, without a trusted third party. Enigma is designed to connect to an existing blockchain and off-load private and intensive computations to an off-chain network.

None of the current technologies and prior art, taken alone or in combination, address nor provide a truly integrated solution in a form of selectively controlling the data privacy by using blockchain applications.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWINGS

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings. In order to better understand the invention and its implementation in a practice, a plurality of embodiments will now be described, by way of non-limiting example only, with reference to the accompanying drawings, in which FIG. 1 shows an example of the process flow using an embodiment of the invention.

FIG. 2 shows a flowchart of an aspect of the invention of the invented method describing the setup stage.

FIG. 3 shows a flowchart of an aspect of the invention of the invented method describing the role of the device of the initiator party in a transaction.

FIG. 4 shows a flowchart of an aspect of the invention of the invented method describing the role of the device of any recipient party in a transaction, which is authorized to share the private data with the initiator device FIG. 5 graphically illustrates an example of computerized system of an embodiment of the invention.

FIG. 6 graphically illustrates Fast Retrieval of Blockchain Smart Contracts Configuration.

FIG. 7 graphically illustrates Model 1 configuration.

FIG. 8 graphically illustrates Model 2 configuration.

FIG. 9 graphically illustrates Model 2 configuration.

FIG. 10 graphically illustrates SMART CONTRACT PRIVACY USING SHARED SECRETS CONFIGURATION.

FIG. 11 graphically illustrates SMART CONTRACT PRIVACY USING SHARED SECRETS CONFIGURATION FLOW.

FIG. 12 graphically illustrates SMART CONTRACT PRIVACY USING SHARED SECRETS WITH ANONYMOUS RECEIVER POST BOX CONFIGURATION.

FIG. 13 graphically illustrates ANONYMOUS RECEIVER POST BOX CONFIGURATION FLOW.

FIG. 14 graphically illustrates SHARING DATA PRIVATELY WITH ANONYMOUS RECIPIENT FLOW.

FIG. 15 graphically illustrates SMART CONTRACT PRIVACY USING SHARED SECRETS WITH ANONYMOUS RECEIVER POST BOX AND ANONYMOUS PERMISSION CHECK CONFIGURATION.

FIG. 16 graphically illustrates GRANT PEMISSION FLOW.

FIG. 17 graphically illustrates ANONYMOUS PEMISSION CHECK FLOW.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The term "crypto-currency" refers to any type of digital currency.

The term "ledger" refers to a principal book or computer file for recording transactions.

The term "blockchain" refers to a public ledger that records peer to peer digital transactions such as Bitcom transactions.

Unless specifically stated otherwise as apparent from the following discussions, it is appreciated that throughout the present description of embodiments, discussions utilizing terms such as "computing", "detecting," "calculating," "processing", "performing," "identifying," "determining" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

The term "smart contracts" refers to digital entities that define complex transaction logic and facilitate cross-organisational workflow including, but not limited to, storage of data, data access permissions, ordered workflow and computation. Digital entities that define complex transaction logic and facilitate cross-organisational workflow including, but not limited to, storage of data, data access permissions, ordered workflow and computation.

The term "public key" refers to a cryptographic key used with a public key cryptographic algorithm that is uniquely associated with an entity and that may be made public.

The term "private key" refers to a cryptographic key, used with a public key cryptographic algorithm that is uniquely associated with an entity and is not made public. A private key can be stored on a device, in the local file system and/or in a hardware secure enclave (HCE), or it can be recorded off-line in a hardware device, an off-line system and/or on paper.

The term "Public key (asymmetric) cryptographic algorithm" refers to a cryptographic algorithm that uses two related keys, a public key and a private key. The two keys have the property that deriving the private key from the public key is computationally infeasible.

The term "Random Number Generator" refers to Random Number Generators (RNGs) used for cryptographic applications which typically produce a sequence of zero and one bits that may be combined into sub-sequences or blocks of random numbers. There are two basic classes: deterministic and nondeterministic. A deterministic RNG consists of an algorithm that produces a sequence of bits from an initial value called a seed. A nondeterministic RNG produces output that is dependent on some unpredictable physical source that is outside human control.

The term "password" refers to a string of characters (letters, numbers, and other symbols) used to authenticate an identity or to verify access authorization.

The term "secret key" refers to a cryptographic key, used with a secret key cryptographic algorithm, that is uniquely associated with one or more entities and should not be made public.

The term "Public key certificate" refers to a set of data that uniquely identifies an entity, contains the entity's public key, and is digitally signed by a trusted party, thereby binding the public key to the entity.

The term "device", "terminal", "computer terminal" interchangeably refers, but not limited to such as a mobile phone, laptop, tablet, wearable computing device, cellular communicating device, PDA, communication device, personal computer, and etc.

Referring now generally to the Figures and particularly to FIG. 1. FIG. 1 shows an example of the process flow using an embodiment of the invention.

At a setup phase (see FIG. 2 description below), each party generates a public/private key pair for the purpose of the smart contact privacy. Each party then uploads its public key into the Public Keys smart contract (PSC).

The use case is related to party A initiating a transaction (initiator A) to a recipient B, a smart contract including private data 1 and public data 2, e.g. in Known Your Customer (KYC) transactions, it may include customer attributes such as customer name which represents a public data item and customer address and bank account which represent private data items. The following steps are performed:

1. Generation of the smart control by initiator A (1.02):
    1.1 Initiator A randomly generates a new shared secret (SH1), encrypts the shared secret using the public key of recipient B and stores the result in the smart contract.
    1.2 Initiator A encrypts data 1 using SH1 and stores the result in a smart contract.
    1.3 Initiator A sends the transaction.
2. Synchronization (1.04)
Blockchain transactions are transmitted to all blockchain network participants and agreed using the blockchain consensus mechanism.
3. Event generation (1.06) and Parsing of the data at recipient B
    3.1 The transaction to write data into the smart contract generates an event.
    3.2 The cache of the recipient B listening to this event is using the event information to understand what has changed in the smart contract and is then decrypting the changed information received from the smart contract via the event using the following steps:
        3.2.1 it uses its private key to decrypt the encrypted shared key.
        3.2.2 it uses the decrypted shared key to decrypt the encrypted data 1.
        3.2.3 The public data and decrypted private data are stored in the secure private cache of recipient B,
4. Recipient B may access the private secure cache at any time (1.08).

Referring now generally to the Figures and particularly to FIG. 2. FIG. 2 shows a flowchart of an aspect of the invention of the invented method describing the setup stage, generating a "public keys" smart contract. There is only one public keys smart contract, shared by all the parties that are interested to share data privately, including all their public keys used for the purpose of smart contract privacy. At step 2.02, a device of a party willing to share private data, is first checking if the public keys smart contract already exits. If this is not the case, it creates a new public keys smart contract at step 2.04. At step 2.06, it then obtains its public key (obtained by the generation of a public key certificate) and at step 2.08, it includes its public key into the public keys smart contract and at step 2.10 it posts the transaction to the blockchain.

Referring now generally to the Figures and particularly to FIG. 3. FIG. 3 is a flowchart of an aspect of the invention of the invented method describing the role of the device of the initiator party in a transaction. In step 3.02, the initiator device generates a shared secret, e.g. using strong random generator such as the ones specified at FIPS PUB 140-2 or using strong password. The shared secret may be unique to each smart contract, unique to each private data item in each smart contract, or even unique to each update of the private data item. For each party (3.04) that is authorized to read the private data (authorized recipients), the initiator device performs:

step 3.06: retrieves the public key of the appropriate recipient from the smart contract.

step 3.08: encrypts the shared secret with the public key of the appropriate recipient.

At step 3.12, the initiator device encrypts the private data using the shared key and at step 3.14 it posts the transaction including all the needed additional information (addresses, encrypted shared keys, encrypted private data and public data if any).

Referring now generally to the Figures and particularly to FIG. 4. FIG. 4 is a flowchart of an aspect of the invention of the invented method describing the role of device of any recipient party in a transaction, which is authorized to share the private data with the initiator device. At step 4.04, the device with the role of recipient, receives the transaction. At step 4.08, it uses its private key to decrypt first the encrypted shared key after retrieving it from shared smart contract, using any asymmetric cryptographic algorithm. At step 4.10, it used the decrypted shared key to decrypt the encrypted private data. At step 4.12, it stores the public data and decrypted private data into its local private secure cache. The historical state storage of the blockchain would enable previous versions of the encrypted data and associated shared secrets to be retrieved at a later date for inspection—even if the shared secret was subsequently changed. The main benefits of the present invention over others are: public key and shared secret distribution occurs using the blockchain smart contracts, so no additional off-chain solution is required for this purpose; the data can be made visible to multiple designated recipients (as well as the original sender); fast data retrieval of the data from smart contracts.

Reference is made now to FIG. 5 which graphically illustrates, according to another preferred embodiment of the present invention, an example of computerized system for implementing the invention 500. The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), touch-screen; or touch-pad, virtual display, or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as C, C++, Assembly, C#™, JAVA™, Flash™ ActionScript, Visual Basic™, JavaScript™, PHP, Python, XML, HTML, etc. or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as TCP/UDP/ICMP/HTTP/DNS/SOAP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Google™ Android™, Unix™/X-Windows™, Windows Mobile™, Windows Phone™, Linux™, etc.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of environment tracking systems, data representing user events, virtual elements, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Privacy In Smart Contracts

The present invention proposes using symmetric and asymmetric techniques in order to populate data in a visible shared ledger that is encrypted in such a way that only a set of predetermined parties can decrypt it and therefore read the data.

The present invention enables the transfer of symmetric keys and asymmetric keys using the blockchain itself, so no other off-chain mechanism is required for the sharing of the keys. Similarly, no central certificate issuing authority/management function is required, thereby maintaining the decentralized nature of the overall solution. In order to achieve data privacy, data encryption/decryption is performed outside of the blockchain (off-line chain) and so private data should be encrypted on the client side before storing the data into the smart contract.

Each party generates a public/private key for the purpose of smart contract privacy management. Encryption of the private data is performed using a shared secret and symmetric cryptographic algorithm such as Digital Encryption Standard (DES). Shared secret is encrypted using the smart contract privacy public keys and are stored into the smart contract, using public key (asymmetric) cryptographic algorithm such as RSA encryption. Public/private key pair is derived from a public key certificate which is obtained by generating a certificate using known software such as Secure Sockets Layer (SSL).

Reference is made now to FIG. 6 which graphically illustrates Fast Retrieval of Blockchain Smart Contracts Configuration.

One of the features of a blockchain smart contract is the ability to generate an event. The event is effectively a write to a local log file that occurs alongside every instance of the blockchain in a network. The listening client application can monitor the eventlog and trigger an event when an event occurs. The present invention proposes to create an in-memory data cache alongside every instance of the blockchain. Every time a smart contract is updated by any of the accounts on any of the blockchain instances in the network, an event is generated, triggering the cache to load the new state of that particular smart contract into its local cache store. The cache should be a secure private cache as it includes privacy data that may be decrypted by the receiving party using their private key.

3 Models of Private Key Configuration:
  a) FIG. 7—A node is for only one party, with only one user. In this configuration, each party has a single dedicated node, and is issued with one private key which resides on the node. In this model, the one private key on the node is used both to sign blockchain transactions, as well as for encryption and decryption of smart contract data. Data will therefore be available in decrypted form on the node.
  b) FIG. 8—A node is for only one party, with multiple users. In this configuration, each party has a single dedicated node, but may have multiple users. Each node will have a single private key which represents the node/party, and is used to send/sign blockchain transactions on behalf of all users. Individual users will create their own (off-node) private key on their own personal device (for example: on their mobile phone). The user private key will be used to cryptographically sign the data sent from the user device. The smart contract will be able to validate that the data provided was signed with the user private key by verifying the signature in the data that was sent to the smart contract (this can be achieved by called a signature verification function inside the smart contract code, in the Ethereum Solidity smart contract programming language, for example, this possible using the ecverify function). In this way, another party or user can independently check that the data was indeed provided by the user, even though the user did not directly sign the blockchain transaction. If the user sending the data wishes to remain anonymous, then the signature validation may occur off-chain. In this configuration data privacy is maintained at the node/party (not user) level, and data will therefore be encrypted and decrypted using the node private key. Data will therefore be available in decrypted form on the node. It assumed that it is acceptable for the data of multiple users belonging to the same party to be open (decrypted) on the party node.
  c) FIG. 9—A node is shared by multiple parties, each with multiple users. A node will have a single private key. Blockchain transactions will be sent/signed by the node private key. Individual users will create their own on-device private key (e.g. on their mobile phone). The user private key will be used to cryptographically sign the data sent from the user device. The smart contract will be able to validate that the data provided was signed with the user private key by verifying the signature in the data that was sent to the smart contract (this can be achieved by called a signature verification function inside the smart contract code, in the Ethereum Solidity smart contract programming language, for example, this possible using the ecverify function). In this way, another party or user can independently check that the data was indeed provided by the user, even though the user did not directly sign the blockchain transaction. If the user sending the data wishes to remain anonymous, then the signature validation may occur off-chain. In this configuration data privacy is maintained at the user device level, therefore private data will only be encrypted and decrypted using the private key on the user device. The private data will remain in encrypted form on the node/server, as this is shared by multiple parties who may not have their data reside in open form on a shared node.

Off-Chain Processing of Private Data, FIG. 10

Where private data resides in encrypted form in either the smart contract, or elsewhere on the node/server (e.g. in a cache, or in memory), it is assumed that processing of that data is limited (e.g. only zero knowledge proof algorithms are available). Processing of private data will therefore only occur at the endpoints where the data is available in open (decrypted) form. In this case, the processing may need to be independently validated by the other parties when they receive it in open (decrypted) form. Processing, and validation of the processing will therefore be multi-step, where independent validation of the processing by the parties is confirmed by sending a blockchain transaction to the smart contract, and only once all required parties have provided a transaction confirming validation of processing, will the processing be regarded as complete by the parties.

Anonymous Privacy in Smart Contracts, FIG. 11-14

When one user (User 1) wishes to share a secret with another user (User 2) through a smart contract in a distributed ledger, User 2 will require a way to identify that the secret is intended for them—this is typically achieved by storing the secret alongside the recipient's (User 2) openly viewable public key (aka blockchain address). The recipient (User 2) may wish to remain anonymous, and not reveal to others that they are the intended recipient of secret data in a smart contract.

The solution is for the intended recipient of the shared secret (Party 2) to create an 'Anonymous Post Box Address'. The Anonymous Post Box Address is simply an identifier (key) which has an associated value, both of which reside in the smart contract.

The intended recipient (User 2) creates the Anonymous Post Box Address, and shares this privately with the User 1. If User 2 has their own individual private key (e.g. on their personal device, while a separate node-level private key is used to send/sign the blockchain transactions), then there will be no open/visible proof revealing that User 2 is the sender/creator of the Anonymous Post Box Address. User 2 can sign the Anonymous Post Box Address using their own user private key, and include that signature alongside the Post Box Address, where both are encrypted using User 1's public key (so that only User 1 can see and validate the proof). In this way, an Anonymous Post Box Address has been created in a smart contract and provided to User 1, without revealing either the Anonymous Post Box Address or the public key of the user that created it.

The sender (User 1) can then post shared secrets to the Anonymous Post Box Address in a smart contract which only the intended recipient (User 2) will listen for. The intended recipient (User 2) can then retrieve the secret associated with the Anonymous Box Address and decrypt it using their private key. Listening involves watching for an Blockchain event generated by a smart contract when the sender of the secret (User 1) posts data (a secret) to the Anonymous Post Box Address in a smart contract, where the listener is listening for an Anonymous Post Box Address.

Anonymous Permissions in a Smart Contract, FIG. 14-17

Data write permissions can be enforced in a smart contract by coding rules ('if' statements) around data updates that query the transaction sender. As every node will execute this code, this means that every node, and therefore every party on the network, will see the public key (address) of the user being checked/granted permission.

Users may wish to hide the fact that they are involved in a smart contract, and therefore avoid having their public key (address) open and visible in that contract. This can be achieved using a 'Permission Secret'.

For example, a user (User 1) creates a smart contract where only a specific user (User 2 who wishes to remain anonymous) is permitted to modify some of the data items.

User 1 will generate a unique Permission Secret. The Permission Secret is then encrypted using User 2's public key, so that only User 2 will be able to decrypt it. The Permission Secret can be sent to User 2 using an Anonymous Post Box Address to ensure that no other party can see with whom the Permission Secret is being shared. If User 1 has a separate private key to the node private key, then the identity of User 1 will also be obscured.

User 1 will then update the smart contract permission checking code to include a hash of the permission secret.

When User 2 is ready to modify the data in the smart contact, it sends a transaction that includes a decrypted (open) copy of the Permission Secret. At this point the Permission Secret is revealed to all the nodes. The smart contract then hashes the open Permission Secret that was provided and compares that with the hashed Permission Secret that was provided by User 1. If there is a match, permission will be granted and the data will be modified. In this way, User 1 is granting User 2 permission to modify the smart contract data without revealing the identity of either party.

The Right to be Forgotten

There are situations where a user wishes to have their data removed from storage systems. Blockchain smart contracts maintain historical state indefinitely, and are therefore able to provide a capability for physically removing historical user data.

The solution for implementing the Right to be Forgotten in a blockchain smart contract is for data to be encrypted and decrypted by the sender using an additional intermediary public key. When data is shared with other users, those user's ability to decrypt the data must be dependent on the intermediary private key that is hidden from them off-chain and is controlled only by the user sharing their data. An off-chain service will be provided by the sender to decrypt the data using the intermediary private key. When they wish to be forgotten, they simply disable the off-chain decryption service and destroy the intermediary private key.

The invention claimed is:

1. A computer implemented method for executing cryptographically secure transaction from an initiator to a recipient, in a network comprising a public ledger, method comprising steps performed by a device of the initiator:
   a. associating a first proposed transaction with a smart contract implemented on the network;
   b. randomly generating a shared key;
   c. encrypting private data, of a second transaction in said network including the private data and public data, using the shared key;
   d. encrypting the shared key using a public key of the recipient from the smart contract; and
   e. associating the second transaction with a cryptographically secure transaction, comprising the encrypted private data and the encrypted shared key; and steps performed by a device of the recipient, upon receiving an event from said network, to parse said cryptographically secure transaction:

f. decrypting said encrypted shared key using a private key of the recipient from said smart contract;

g. decrypting said encrypted private data using the decrypted shared key; and h. storing said decrypted private data and said public data into a local secure cache.

2. The method of claim 1, wherein said encryption and decryption of the shared key is by using RSA technology.

3. The method of claim 1, wherein said encryption and decryption of the private data is by using DES technology.

4. A non-transitory computer-readable medium with instructions stored thereon, that when executed by a processor, perform steps comprising steps performed by a device of the initiator:

a. associating a first proposed transaction with a smart contract;

b. randomly generating a shared key;

c. encrypting private data, of a second transaction in said network including the private data and public data, using the shared key;

d. encrypting the shared key using a public key of the recipient from the smart contract; and e. associating the second transaction with a cryptographically secure transaction, comprising the encrypted private data and the encrypted shared key; and steps performed by a device of the recipient, upon receiving an event from said network, to parse said cryptographically secure transaction:

f. decrypting said encrypted shared key using a private key from said smart contract;

g. decrypting said encrypted private data using the decrypted shared key; and h. storing said decrypted private data and said public data into a local secure cache.

5. The non-transitory computer-readable medium of claim 4, wherein said encryption and decryption of the shared key is by using RSA technology.

6. The non-transitory computer-readable medium of claim 4, wherein said encryption and decryption of the private data is by using DES technology.

7. A computer terminal for executing cryptographically secure transactions in a network comprising a public ledger, the terminal comprising:

a. a processing unit;

b. a communication interface communicatively coupled to the processing unit for transmitting and receiving information;

c. a local private secure cache for storing information; and d. a memory communicatively coupled to the processing unit for storing instructions, wherein the processing unit is configured to initiate a transaction:

i) associate a first proposed transaction with a smart contract;

ii) randomly generate a shared key;

iii) encrypt private data, of a second transaction in said network including the private data and public data, using the shared key;

iv) encrypting the shared key using a public key of a recipient from the smart contract; and v) associate the second transaction with a cryptographically secure transaction, comprising the encrypted private data and the encrypted shared key; and the processing unit is further configured to parse the cryptographically secure transaction upon receiving an event from said network to:

vi) decrypt said encrypted shared key using a private key from said smart contract;

vii) decrypt said encrypted private data using the decrypted shared key; and viii) store said decrypted private data and said public data into a local secure cache.

8. The computer terminal of claim 7, wherein said encryption and decryption of the shared key is by using RSA technology.

9. The computer terminal of claim 7, wherein said encryption and decryption of the private data is by using DES technology.

* * * * *